May 2, 1950     W. A. BIERMANN ET AL     2,505,938
THERMOSTATIC SWITCH

Filed Feb. 8, 1946     3 Sheets-Sheet 1

INVENTORS.
WILLIAM A. BIERMANN
LOURDES V. McCARTY
BY John W. Michael
ATTORNEY.

May 2, 1950 W. A. BIERMANN ET AL 2,505,938
THERMOSTATIC SWITCH
Filed Feb. 8, 1946 3 Sheets-Sheet 2
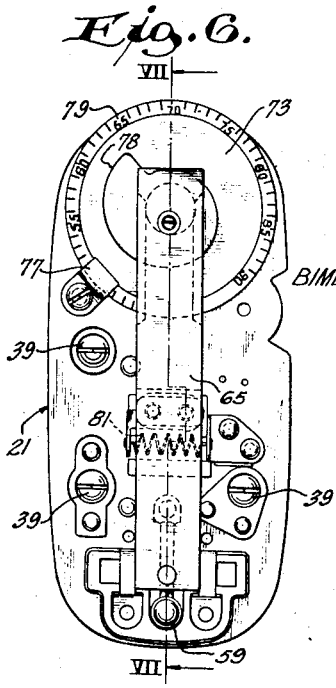
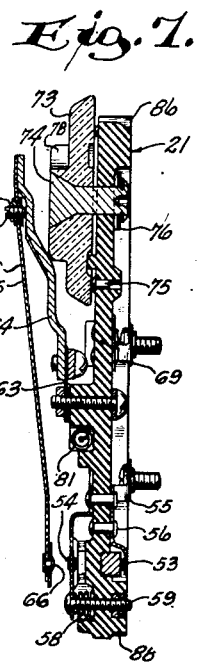
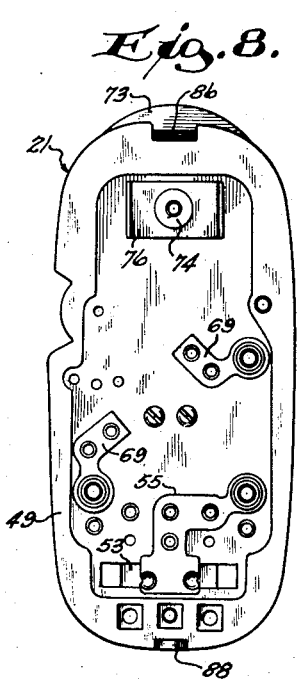
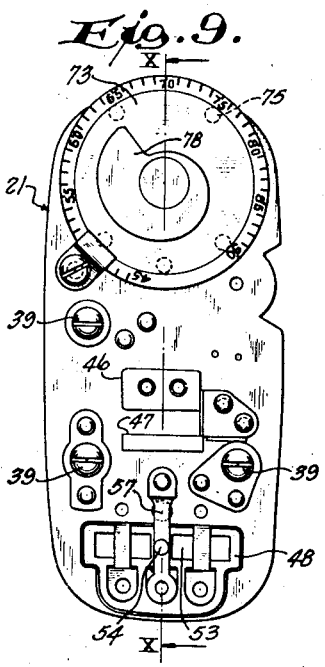
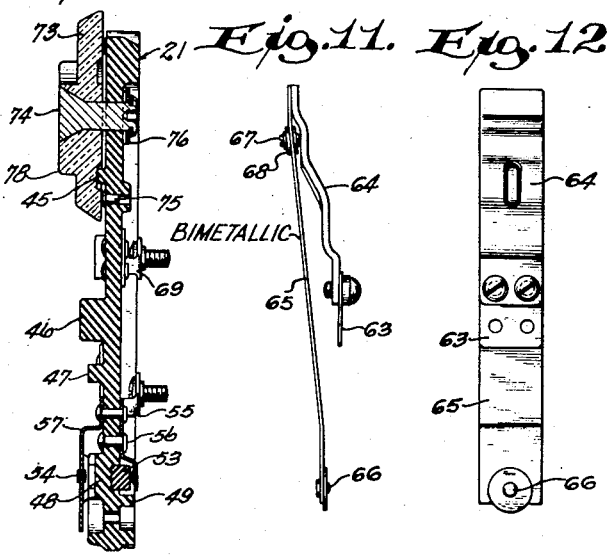
INVENTORS.
WILLIAM A. BIERMANN
LOURDES V. McCARTY
BY John W. Michael
ATTORNEY.

May 2, 1950 W. A. BIERMANN ET AL 2,505,938
THERMOSTATIC SWITCH
Filed Feb. 8, 1946 3 Sheets-Sheet 3
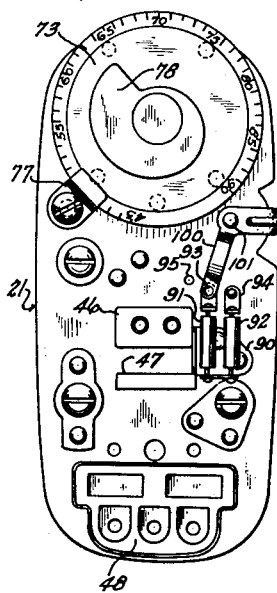
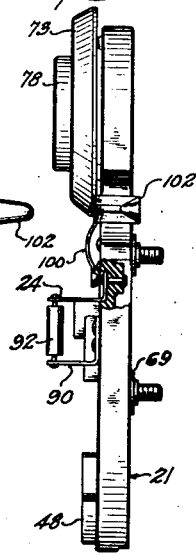
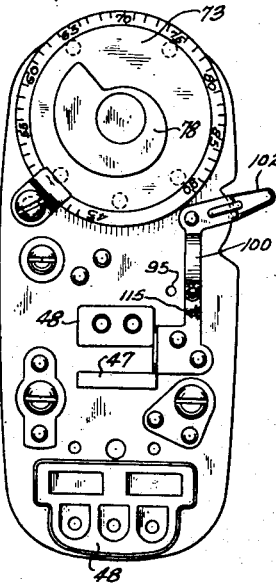
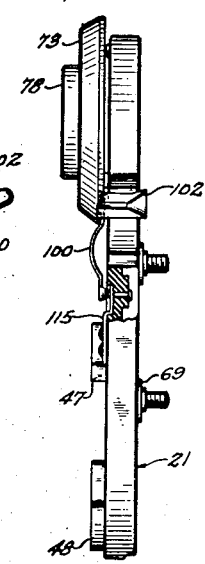
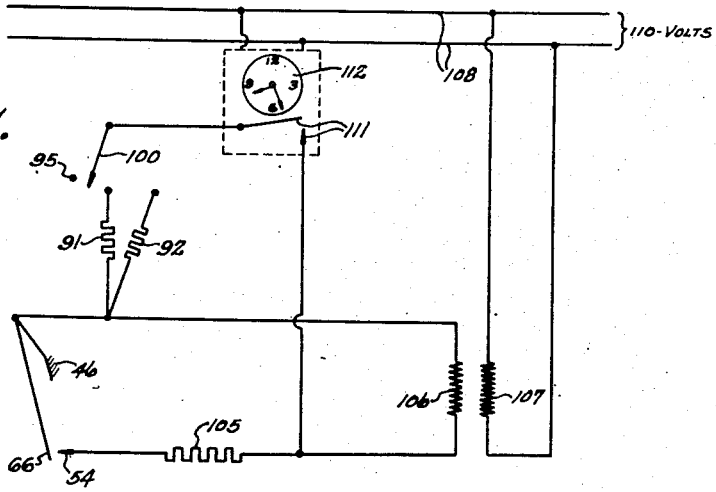
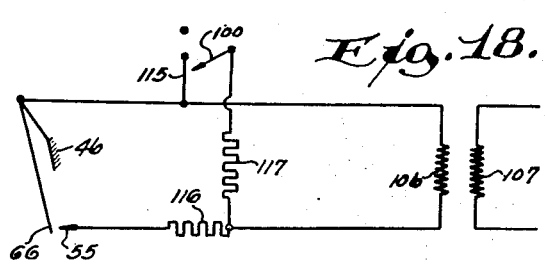
INVENTORS.
WILLIAM A. BIERMANN.
LOURDES V. McCARTY
BY John W. Michael
ATTORNEY.

Patented May 2, 1950

2,505,938

UNITED STATES PATENT OFFICE 2,505,938

THERMOSTATIC SWITCH

William A. Biermann and Lourdes V. McCarty, Milwaukee, Wis., assignors to Automatic Products Company, Milwaukee, Wis., a corporation of Wisconsin Application February 8, 1946, Serial No. 646,361

5 Claims. (Cl. 200—139)

This invention relates to improvements in devices for opening and closing an electrical circuit responsive to temperature variations and particularly to a thermostat by which the temperature in a given space may be adjustably controlled.

It is one object of the present invention to provide a thermostat in which the sensitivity is greater than heretofore obtained and which may be readily varied as desired, which may be readily calibrated and will retain such calibration in use, and which may be set more accurately than heretofore to obtain control at any desired temperature during use.

Another object of the invention is to provide a thermostat divided into a plurality of sub-assemblies which are clamped together under spring tension, thus avoiding loosening of the parts by vibration of such parts during use.

Another object of the invention is to provide a thermostatic switch in which the parts of a thermally responsive subassembly are adjustably angularly related for adjustment after manufacture to compensate for inaccuracies in manufacture by, in effect, re-forming a bimetallic element of the sub-assembly.

Another object of the invention is to provide a thermostat in which the fixed contact is adjustably positioned relative to the poles of a permanent magnet whereby an adjustable snap action is obtained in the opening and closing of the thermostat contacts.

Another object of the invention is to provide a thermostat including a thermally responsive sub-assembly directly adjustable in the direction of its movement to vary the position thereof and provided with means for varying the relationship between the several parts of such sub-assembly.

Another object of the invention is to provide a thermostat in which the effects of air currents on the thermal element are minimized.

Another object of the invention is to provide a thermostat in which the parts thereof are simplified and reduced in number, are sub-divided to avoid the formation of stresses in assembly or in use and to provide for easy and quick assembly and calibration of the parts to the desired operating positions, and to make the device easy and simple to install and accurate in operation throughout the entire life of the device.

Objects and advantages other than those above set forth will be apparent from the following description when read in connection with the accompanying drawings, in which:

Fig. 6 is a top plan view of the operating mechanism of the thermostat and of the panel sub-assembly on which such mechanism is mounted;

Fig. 7 is a longitudinal section taken on the plane of broken line VII—VII of Fig. 6;

Fig. 8 is a plan view of the reverse of the mounting panel shown in Figs. 6 and 7;

Fig. 9 is a top plan view of the mounting panel with the thermally responsive mechanism removed therefrom;

Fig. 10 is a longitudinal section taken on the plane of line X—X of Fig. 9;

Fig. 11 is a side view of the thermally responsive sub-assembly;

Fig. 12 is a bottom plan view of the structure shown in Fig. 11;

Fig. 13 is a view similar to Fig. 9 but showing a modification in which the thermostat is provided with means for controlling an auxiliary circuit;

Fig. 14 is a side elevation, with a portion broken away, of the structure shown in Fig. 13;

Fig. 15 is a view similar to Fig. 9 but showing a second modification of the present device adapted for controlling an auxiliary circuit;

Fig. 16 is a side elevation of Fig. 15, with a portion thereof broken away;

Figure 1:
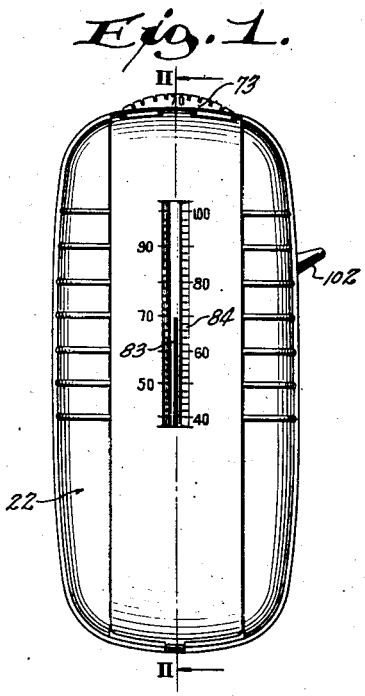
Fig. 1 is a front elevation of the completed device.
Figure 2:
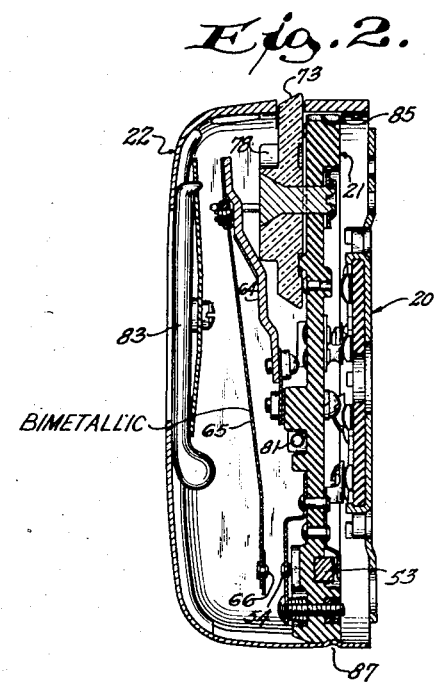
Fig. 2 is a section taken longitudinally of the device on the plane of line II—II of Fig. 1.
Figure 3:
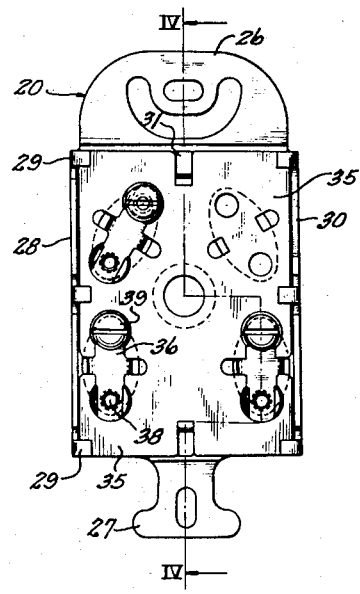
Fig. 3 is a top plan view of the base and terminal board sub-assembly of the thermostat of the present invention.
Figures 4, 5:
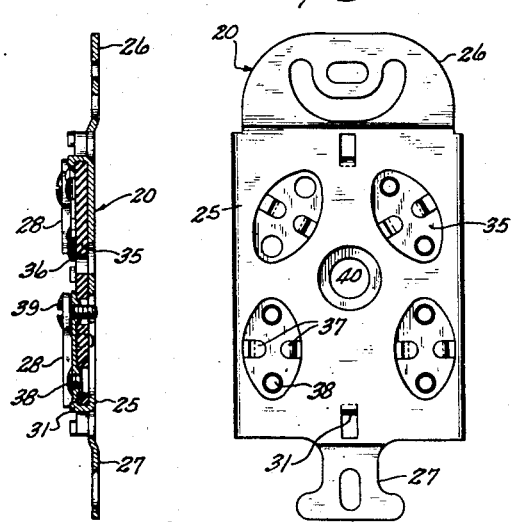
Fig. 4 is a section taken on the planes of broken line IV—IV of Fig. 3.
Fig. 5 is a plan view of the reverse side of the base and terminal board of Figs. 3 and 4.

Fig. 17 diagrammatically illustrates one manner for connecting the structure shown in Figs. 13 and 14; and Fig. 18 diagrammatically illustrates one way of connecting the structure shown in Figs. 15 and 16.

Generally, the present device comprises a base or terminal board by which the entire device may be mounted on a supporting surface and which bears terminals to which the several conductors of an electric circuit or circuits, to be controlled, are connected. A panel of suitable electrical insulating material is supported on the base and has mounted thereon the thermally responsive operating mechanism of the device by which the electrical circuit is opened and closed. And the base and terminal board, the mounting panel and the operating mechanism are substantially enclosed by a cover of ornamental appearance and bearing a thermometer giving visual indication of the temperature at which the device is being operated.

Referring more particularly to the drawings, the reference numeral 20 generally designates a base and terminal board which supports a mounting panel, generally indicated at 21, and which in turn supports a cover 22. The base and terminal board includes a metal plate 25 of substantially rectangular form provided with end lugs 26 and 27 which are apertured to receive fastening means and are slotted and otherwise shaped to give a material degree of resilience to such lugs. The lugs 26 and 27 are offset from the body of the plate to allow for mounting of the device on surface of material roughness and generally parallel with such surfaces. The plate 25 is flanged, as indicated at 28, along several of the sides thereof with ears 29 formed from the flanges, a portion 30 of one of the flanges being cut away for a purpose which will appear hereinafter. It will be seen that flanges 28 extend above the surface of the insulating plate 35 which keeps the insulating plate spaced from the mounting panel regardless of the degree to which the base board and the mounting panel are clamped together. Ears 31 are struck from the body of the metal plate and both the ears 29 and 31 are bent inwardly to hold a plate 35 of insulating material in predetermined relationship on the metallic plate 25. The ears 29 and 31 securely engage the insulating plate 35 at a plurality of points on all edges thereof, thus limiting warpage of such plate to a degree which cannot affect panel 21 and hence preventing displacement of the operating mechanism from the desired positions.

The metal plate 25 is apertured in the portion beneath the insulating plate for the purpose of providing insulation, from the metal plate, of terminals and mounting clips 36 provided with ears 37 extending through apertures in the insulating plate and bent into engagement with the insulating plate. Each of the clips 36 is provided with apertures, as shown at 38, which are internally threaded to receive terminal and/or mounting screws 39 extending through holes in the insulating plate and in spaced relation to the metal plate. The screws 39 may of course serve only as binding posts for the circuit conductor ends or as means for mounting the panel 21 on the base board 20, or for both purposes, as desired. An aperture 40 through both the plates 25 and 35 allows the several conductors of an electrical circuit to be brought through the base and terminal board in insulated relation.

The mounting panel 21 is also preferably formed of electrical insulating material with apertures therethrough and with a projection 45 and various bosses or flanges 46, 47 and 48 extending from one surface for seating and otherwise retaining thereon the various portions of the operating mechanism to be described. The other side of the panel is formed with a flange 49 about the entire perimeter thereof for the purpose of strengthening the panel and to define a recess receiving portions of the operating mechanism. The bosses 48 and the apertures adjacent thereto receive and position a fixed contact structure including a permanent magnet 53 and an adjustably mounted contact 54. The magnet poles project through the apertures in and extend above the surface of the panel 21 for a small distance and the magnet is held in position by a clamp 55 fixed on the panel as by rivets 56.

The contact 54 is mounted on a flexible or resilient arm 57 fixed at one end on the panel 21 and extending between the poles of the magnet with the surface of contact 54 substantially flush with the pole faces. The position of the contact 54 depends on whether arm 57 is merely flexible or resilient; if flexible only, the position is determined by the action of a compression spring 58 on the arm 57, the degree of compression of the spring being determined by the bolt and nut 59 which are locked, as by soldering, after the device is calibrated. If the arm 57 is resilient, the spring 58 may be omitted. It will be understood that the magnet clamp 55 also forms a connector for the fixed contact and is located in the recess in the reverse side of the panel 21 in such position that one of the screws 39 may electrically join the connector with one of the terminal clips mounted on the base and terminal board 20.

A movable contact sub-assembly coacts with the fixed contact 54 and includes a leaf spring 63 mounted on the panel boss 46. The leaf spring 63 is provided with elongated holes by which the position of the spring and of the parts supported thereby may be shifted relative to the boss. The spring serves as a hinge for a rigid arm 64 and a bimetal 65 fixed at one end to the free end of the arm and extending in spaced relation thereover and carrying a movable contact 66. The bimetal is a substantially straight strip with no bows or large bends throughout its length which simplifies manufacture and adjustment and provides a quicker response to temperature changes in use. The angular relationship of the arm and bimetal may be varied by means of a screw 67 threaded in a bushing 68 set into the bimetal, the end of the screw projecting into engagement with the arm. The angle between the arm 64 and the bimetal 65 is varied uniformly upon adjustment of screw 67 thus in effect reforming the bimetal and allowing compensation for manufacturing inaccuracies.

When the device is being assembled, the movable contact 66 is first positioned relative to the fixed contact 54 by adjustment of the arm 64 on the hinge 63. When the contacts are in the proper relationship, the arm is fixed on the hinge. The screw 67 is then adjusted, at the factory, to give the proper initial relation of the several contacts and is likewise locked, as by solder, in its adjusted position. An electrical connection is made with the movable contact supporting means by way of one of several connectors 69 located in the recess in the mounting panel and connected by one of the screws 39 with one of the terminal clips 36. The several connectors are resilient and are under tension, when the device is assembled, to secure a firm bearing of the base board on the mounting panel flange about the entire periphery of the panel.

The position of the movable contact 66 relative to the fixed contact 54 is adjustable by the user of the thermostat upon rotation of a thumbwheel 73 rotatably mounted on the panel 21 by an axle 74. The wheel 73 is held in contact with a plurality of rivets or studs 75 projecting above the panel, by a spring 76 acting between the panel and the wheel axle, the wheel being formed with a groove within the area defined by the studs to receive the projection 45 which acts with the groove as a rotation limiting stop. The wheel and studs are of dissimilar materials such as a non-metal and a metal which reduces the friction between the bearing surfaces to a low value. A guide 77 mounted on the panel extends over the edge of the wheel to assist in retaining the wheel in its desired position at all times. The wheel is formed with a boss 78 extending beyond the upper surface thereof and providing a spiral edge acting as a cam movable directly in contact with the arm 64 of the movable contact which forms an inclined plane relative to the cam edge. The wheel is provided with a scale on the periphery thereof, as indicated at 79, and is so mounted that the edge of the dial projects through and slightly beyond the cover 22. It will be understood that the thermostat is so calibrated that the scale 79 provides for accurate setting of the bimetal to secure opening and closing of the contacts at any desired value of the ambient temperature. The cam 78 is not a mathematical spiral but is so made that, in co-action with the inclined surface of the arm 64, the scale 79 may be made uniform over the entire desired range of bimetal adjustment and may be extended along the wheel periphery as much as desired to promote accuracy in such adjustment. The parts above described substantially determine the degree to which the completed device extends from the mounting surface and allow the making of a materially thinner unit than heretofore.

The present thermostat is provided with means for anticipating changes in the temperature which is to be effective on the bimetal. A coil 81 of bare electric resistance wire forming a heater is mounted in the space between the adjacent bosses 46 and 47 which shield the heater against air currents in the device, thus minimizing the undesirable effect of such currents. The heater is connected at one end with the connector 69 for the movable contact of the thermostat and, at the other end, is connected to one of the terminal clips 30. The heater operates as is well known to anticipate heat requirements and aids the bimetal in maintaining a uniform temperature, wherefor the action thereof need not be further described.

The cover 22 is formed to fit over and enclose all portions of the structure above described excepting for a portion of the edge 79 of the dial and a portion of the handle of an auxiliary switch to be described. The cover is of such size as to provide ample space for movement of the operating mechanism above described and to permit access of air into the cover and to the operating mechanism. The cover is slotted in the front thereof to provide for visibility of a thermometer 83 suitably mounted within the cover for adjustment to conform with a scale 84 on the cover adjacent the longitudinal edges of the slot. The cover is provided internally thereof and at its ends with a resilient tongue 85 for engagement with a notch 86 and with an internal projection 87 for engagement with a notch 88, the several notches being formed in the ends of the mounting panel 21 and serving to locate the mounting panel and the parts carried thereby in the cover. It will be seen that the tongue on the cover is under tension thus locating the mounting panel etc. vertically in the cover while the several notches locate the mounting panel etc. in the cover in a lateral direction. The present structure gives the cover a bias or tendency to creep more securely on the mounting panel, thus insuring retention of the cover in the desired position.

Figs. 13 and 14 disclose a modified construction in which a lug 90 is connected with the bimetal 65 and forms a conductive connection and support having one end of each of a plurality of electric heating units 91 and 92 of different values and severally connected at their other ends with lugs 93 and 94. The lugs 93 and 94 are arranged to provide two points of an arc, a third point being given by a socket 95. A switch arm 100 is pivoted at 101 on the mounting panel 21 at the center of the arc 93, 94, 95, and sweeps over the arc points upon movement of a handle portion 102 projecting through the cut-out 30 in the flange of the base board 20 and also projecting through a slot in the side of the cover 22. The lugs 93 and 94 are preferably formed with projections engageable with a depression in the switch arm which can also engage in the socket 95 to give a positive end positioning of the switch arm.

Referring to Fig. 17, it will be seen that the contacts 54 and 66 are connected in series circuit with control means shown as an electrical resistor 105 and the secondary winding 106 of a transformer having its primary winding 107 connected with a suitable source of alternating current indicated at 108. Such control resistor is energized only when the bimetal brings the contact 66 into engagement with the contact 54. The heaters 91 and 92 are severally connected in a separate circuit also including the transformer secondary winding 106, a switch 111 combined with and operated by a clock indicated at 112, the circuit of course including the switch arm 100.

In the operation of the modified device, the heater 91, for example, is of higher value than heater 92, and is engaged by the switch arm 100. When the switch 111 is closed by the clock 112, as for example in the nighttime, the temperature about the bimetal is somewhat raised so that the bimetal is less sensitive to the temperature about the thermostat than heretofore and such temperature is kept at a lower value. If an even lower room temperature is desired, the higher value heater 92 is engaged and makes the bimetal even less sensitive to ambient temperature than theretofore until the clock 112 opens its switch 111 and cuts out heater 92.

In the modification shown in Figs. 15, and 16, lugs 90, 93, and 94 are replaced by a single lug 115, and the control resistor, 105 of Fig. 17, is divided into two portions 116 and 117. The switch arm 100 can then complete only one circuit, and as shown in Fig. 18 entirely controls such circuit. In operation, the bimetal 65 intermittently controls energization of the resistor 116 by way of the contacts 54 and 66, as is usual, but the resistor 117 is manually controlled and may be continuously in circuit. Hence, the present construction is particularly applicable to the operation of a fuel burner at different levels to secure either high or low pilot flame, or two stages of high fire, to produce two stage operation of an air conditioning system with the element 117 continuously in operation to satisfy a base load while the element 116 is intermittently operated as the air conditioning load varies, or for the control of a motor driven fan in a ventilating system and for other uses.

It will be seen from the above description that the present structure includes a reduced number of parts and parts materially simplified as compared to prior thermostats. The individual elements are combined into only a few sub-assemblies which facilitates manufacture and calibration of the thermostat. Such simplification also improves the accuracy of the thermostat and makes replacement of parts particularly easy while in use. The thermal element can be practically re-formed during calibration which eliminates waste in manufacture of an expensive part and damage to such element in use can usually be overcome by mere re-setting of the thermal subassembly. The sensitivity of the thermal element is greatly increased and the range of accurate operation is considerably extended because no material stresses are imposed on the bimetal due to its adjustment in use. Hence, the scale for adjustment can be extended over a greater length and the thermostat can be more accurately and more easily set by the user. The snap opening and closing action of the contacts reduces arcing damage to the contacts and such action may be adjusted as required in any particular installation. The various sub-assemblies are held together under spring tension, thus avoiding inadvertent change in the relation of the parts during use.

Although but a few embodiments of the present invention have been illustrated and described, it will be apparent to those skilled in the art that various changes and modifications may be made therein without departing from the spirit of the invention or from the scope of the appended claims.

We claim:

1. In a thermostatically actuated switch, an electrical insulating panel, a fixed contact mounted on the panel, a flexible hinge fixed at one end on the panel and extending in spaced relation thereto, a rigid arm secured to the other end of the hinge, a generally straight bimetallic element fixed at one end and extending at an acute angle with respect to and from the free end of the arm, a screw extending through the bimetallic element adjacent said one end of the element and bearing on the arm to vary the angular relation therebetween, and a contact mounted on the bimetallic element and movable upon flexing thereof into contact with the fixed contact.

2. In a thermostat, an electrical insulating panel, a fixed contact mounted on the panel, a leaf spring mounted on and having a free end extending in spaced relation over the panel, a rigid arm fixed on the free end of the spring for movement relative to the panel, the arm having a portion inclined at an angle to the panel, a bimetallic element mounted on the arm and flexing relative thereto responsive to ambient temperature changes from a value determined by the position of the arm relative to the panel, a contact mounted on the bimetallic element and movable thereby into and out of engagement with the fixed contact, and a cam rotatably mounted on the panel and beneath the arm for engagement with the inclined portion thereof, the cam surface moving lengthwise of the inclined arm portion for changing the position of the arm relative to the panel.

3. In a thermostat, a rigid base, electric circuit terminals fixed on the base, an electrical insulating panel, a fixed contact mounted on the panel, a thermally responsive element mounted on the panel, a contact mounted on the thermal element and movable thereby into contact with the fixed contact, means for adjusting the position of the thermal element relative to the fixed contact, a plurality of resilient terminals mounted on the panel and severally connected with the contacts, and a plurality of screws severally engaging the base and the panel terminals for flexing the panel terminals to hold the base and the panel together under the tension of the panel terminals.

4. In a thermostat, a rigid base, electric circuit terminals fixed on the base, an electrical insulating panel having a peripheral flange defining a recess in the panel, a fixed contact mounted on the panel, a thermally responsive element mounted on the panel, a contact mounted on the thermal element and movable thereby into contact with the fixed contact, means for adjusting the position of the thermal element relative to the fixed contact, a plurality of resilient terminals mounted in the panel recess and severally connected with the contacts, and a plurality of screws severally engaging the base and the panel terminals for flexing the panel terminals to hold the panel flange firmly on the base under the tension of the panel terminals.

5. In a room thermostat having a fixed contact mounted on an electrical insulating panel, a rigid arm having one end fixed on the free end of a leaf spring mounted on the panel and urging the arm toward the panel, a portion of the arm being inclined with respect to the panel, a generally straight bimetal mounted at an acute angle on the free end of the arm and extending over the fixed contact, a contact carried by the bimetal and adapted to strike the fixed contact when the bimetal flexes in response to ambient temperature, a calibrating screw engaging the bimetal and abutting the arm adjacent the mounting point therebetween to adjust the angle between the bimetal and the arm to obtain the proper initial distance between the contacts, a wheel rotatably mounted on the panel between the free end of the arm and the panel and having a raised portion the periphery of which forms a cam surface adapted to act on the inclined arm portion so that wheel rotation varies the distance between the contacts to determine the ambient temperature at which the contacts close.

WILLIAM A. BIERMANN.
LOURDES V. McCARTY.

REFERENCES CITED

The following references are of record in the file of this patent:

UNITED STATES PATENTS

| Number | Name | Date |
| --- | --- | --- |
| 2,225,080 | Newman | Dec. 17, 1940 |
| 2,250,135 | Lindemann | July 22, 1941 |
| 2,253,162 | Ayers | Aug. 19, 1941 |
| 2,263,988 | Hardy et al. | Nov. 25, 1941 |
| 2,290,944 | Cunningham | July 28, 1942 |